US012579534B2

(12) United States Patent
Pharr et al.

(10) Patent No.: US 12,579,534 B2
(45) Date of Patent: Mar. 17, 2026

(54) IR DISPLAY FOR USER AUTHENTICATION

(71) Applicant: Capital One Services, LLC, McLean, VA (US)

(72) Inventors: Jeff Pharr, McLean, VA (US); David Wurmfeld, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 70 days.

(21) Appl. No.: 18/391,856

(22) Filed: Dec. 21, 2023

(65) Prior Publication Data

US 2024/0119440 A1    Apr. 11, 2024

Related U.S. Application Data

(63) Continuation of application No. 16/681,870, filed on Nov. 13, 2019, now abandoned.

(51) Int. Cl.
| | |
|---|---|
| *G06Q 20/32* | (2012.01) |
| *G06Q 20/10* | (2012.01) |
| *G06Q 20/38* | (2012.01) |
| *H04N 23/20* | (2023.01) |

(52) U.S. Cl.
CPC ..... *G06Q 20/3276* (2013.01); *G06Q 20/1085* (2013.01); *G06Q 20/3223* (2013.01); *G06Q 20/3226* (2013.01); *G06Q 20/388* (2013.01); *H04N 23/20* (2023.01)

(58) Field of Classification Search
CPC ........... G06Q 20/3276; G06Q 20/1085; G06Q 20/3223
See application file for complete search history.

(56) References Cited

U.S. PATENT DOCUMENTS

| | | | | |
|---|---|---|---|---|
| 8,121,914 B1 * | 2/2012 | Drummond | ............. | H04L 63/12 |
| | | | | 705/35 |
| 8,924,712 B2 * | 12/2014 | Varadarajan | .......... | H04W 12/06 |
| | | | | 713/155 |
| 10,270,587 B1 * | 4/2019 | Wu | ........................ | H04L 9/3234 |
| 10,325,087 B1 * | 6/2019 | Goodsitt | ................. | G06F 21/36 |

(Continued)

FOREIGN PATENT DOCUMENTS

| | | | | | |
|---|---|---|---|---|---|
| EP | | 2587432 A1 * | 5/2013 | ......... | G06Q 20/1085 |
| WO | WO-2014043905 A1 * | | 3/2014 | ......... | G06Q 20/3224 |

(Continued)

OTHER PUBLICATIONS

US Payments Forum, "Guidelines for Contactless ATM Transactions—A Guide for ATM Owners and Operators", Jul. 2019, 30 pages. Available at: https://www.uspaymentsforum.org/wp-content/uploads/2019/08/Contactless-ATM-Guidelines-FinalV2-July-2019.pdf (Year: 2019).*

*Primary Examiner* — Gregory Harper
(74) *Attorney, Agent, or Firm* — Foley & Larder LLP

(57) ABSTRACT

A device for conducting a transaction by generating and displaying QR codes in the infrared spectrum, by generating a first QR code; displaying the first QR code via the infrared array for a predetermined duration of time; receiving a confirmation that a user device has entered paired state with the transaction device based on the user device scanning the first QR code; receiving authentication data indicating that the paired user device is authorized to complete the transaction; completing the transaction.

19 Claims, 10 Drawing Sheets

(56) References Cited

U.S. PATENT DOCUMENTS

| | | | | |
|---|---|---|---|---|
| 10,331,874 B1* | 6/2019 | Benkreira | G06Q 20/322 |
| 10,445,711 B1* | 10/2019 | Arumugam | G06Q 20/3274 |
| 10,452,897 B1* | 10/2019 | Benkreira | G06V 40/172 |
| 10,504,083 B2* | 12/2019 | Forsyth | G07F 19/20 |
| 10,521,814 B1* | 12/2019 | Collins | G07F 7/1025 |
| 10,885,751 B2* | 1/2021 | Hazard | G06Q 20/4097 |
| 10,977,641 B2* | 4/2021 | Faith | G06Q 20/223 |
| 2004/0012569 A1* | 1/2004 | Hara | G06K 7/1095 |
| | | | 345/169 |
| 2006/0006224 A1* | 1/2006 | Modi | G06Q 20/108 |
| | | | 235/379 |
| 2012/0265679 A1* | 10/2012 | Calman | G06Q 20/3278 |
| | | | 709/227 |
| 2012/0265809 A1* | 10/2012 | Hanson | H04L 67/141 |
| | | | 709/204 |
| 2013/0058658 A1* | 3/2013 | Friese | G08C 23/04 |
| | | | 398/115 |
| 2013/0124411 A1* | 5/2013 | Kobres | G06Q 40/02 |
| | | | 235/379 |
| 2013/0238442 A1* | 9/2013 | McIntosh | G06Q 20/327 |
| | | | 705/43 |
| 2014/0263618 A1* | 9/2014 | McCarthy | G06Q 40/02 |
| | | | 235/379 |
| 2015/0041530 A1* | 2/2015 | Burkhart | G06K 7/1404 |
| | | | 235/494 |
| 2015/0058216 A1* | 2/2015 | Luciani | G06Q 20/3276 |
| | | | 705/43 |
| 2015/0235190 A1* | 8/2015 | Urban | G06Q 20/4012 |
| | | | 705/72 |
| 2015/0254655 A1* | 9/2015 | Bondesen | G06Q 20/3821 |
| | | | 705/72 |
| 2015/0255021 A1* | 9/2015 | Wu | G09G 3/3426 |
| | | | 345/83 |
| 2016/0019641 A1* | 1/2016 | Barnett | G06Q 40/02 |
| | | | 705/35 |
| 2016/0098692 A1* | 4/2016 | Johnson | G06Q 20/389 |
| | | | 705/43 |
| 2016/0267461 A1* | 9/2016 | Chang | G06Q 20/3829 |
| 2016/0364729 A1* | 12/2016 | Ruparelia | G06Q 20/1085 |
| 2017/0103572 A1* | 4/2017 | Lin | G06T 19/006 |
| 2017/0193124 A1* | 7/2017 | Wong, Jr. | G06K 7/10297 |
| 2017/0262823 A1* | 9/2017 | Hartung | G06Q 20/1085 |
| 2018/0082283 A1* | 3/2018 | Sharma | G06Q 20/42 |
| 2018/0096323 A1* | 4/2018 | Baber | G06Q 20/4012 |
| 2018/0130035 A1* | 5/2018 | Dhulipalla | G06Q 20/40 |
| 2018/0227470 A1* | 8/2018 | Rönngren | H04N 5/2628 |
| 2018/0341934 A1* | 11/2018 | Rodrigues | G07F 19/209 |
| 2018/0374134 A1* | 12/2018 | Siegel | G06Q 10/02 |
| 2019/0073663 A1* | 3/2019 | Jamkhedkar | G06Q 20/325 |
| 2019/0108731 A1* | 4/2019 | Hazard | G07F 19/206 |
| 2019/0139464 A1* | 5/2019 | Huang | G09G 3/3413 |
| 2019/0147506 A1* | 5/2019 | Phillips | H04W 4/02 |
| | | | 705/346 |
| 2019/0205849 A1* | 7/2019 | Nuzzi | H04W 4/021 |
| 2019/0267036 A1* | 8/2019 | Albertson | G06F 21/64 |
| 2019/0295055 A1* | 9/2019 | Kuchenski | G06Q 20/1085 |
| 2019/0333061 A1* | 10/2019 | Jackson | G06Q 20/1085 |
| 2021/0027295 A1* | 1/2021 | Raquepaw | G07F 19/206 |
| 2021/0042743 A1* | 2/2021 | Green | G07F 19/206 |

FOREIGN PATENT DOCUMENTS

| | | | | |
|---|---|---|---|---|
| WO | WO-2017155530 A1 * | 9/2017 | G06Q 20/352 |
| WO | WO-2018189165 A1 * | 10/2018 | H04L 9/0637 |

* cited by examiner

100

QR Code

<u>300</u>

310 — Processor

320 — I/O

340 — Network Controller

350 — System Server

330 — MEMORY

334 — Operating Data

332 — Transaction Data

700

Authenticate Identity — 702

Specify Transaction Type — 704

Specify Transaction Amount — 706

Verify Amount — 708

No

Yes

Specify Method — 710

Confirmation — 712

Present to ATM — 714

800

900

IR DISPLAY FOR USER AUTHENTICATION

CROSS REFERENCE TO RELATED APPLICATIONS

This application is a continuation of U.S. patent application Ser. No. 16/681,870, filed Nov. 13, 2019, which is expressly incorporated herein by reference in its entirety.

TECHNICAL FIELD

The disclosed embodiments generally relate to improvements to transaction devices, such as cash kiosks or Automatic Teller Machines, and more particularly, to improvements to security of transactions through use of infrared QR codes.

BACKGROUND

Automated Teller Machines ("ATMs") have been in use for years, and consumers rely on these devices to access cash at locations around the world. In a typical ATM transaction, a consumer inserts a plastic card into a card reader of the ATM and the ATM reads information from a magnetic stripe on the card or a chip embedded in the card. The information is used to establish communication with a financial services provider associated with the consumer's financial account, and the consumer is then prompted to enter a personal identification number ("PIN") or other verification information. Once verified, the consumer is able to select an amount of cash (subject to account limits and balance) to receive from the ATM. The process is simple and relatively secure, and consumers around the world are used to the process.

Increasingly, however, consumers wish to conduct transactions without plastic payment cards. It would be desirable to allow consumers an ability to interact with ATM devices using their mobile device (such as a mobile phone) to withdraw/deposit cash or to conduct other transactions at the ATM.

Machine-readable codes, such as barcodes and matrix barcodes, can be used to encode or represent data. These machine-readable codes can be read or scanned by specially designed optical scanners, e.g., barcode readers. Originally, machine-readable codes were limited in application due to the small amount of data that could be encoded. Further, the need for special optical scanners also limits the settings in which machine-readable codes are practical.

Today, technology has advanced such that machine-readable codes can be used to encode a much greater amount of information than the original linear barcodes. Further, it is now possible to use digital cameras to read barcodes. These digital cameras have become almost ubiquitous thanks in large part to the number of mobile phones that come equipped with cameras. Thus, the potential uses for machine-readable codes have also greatly increased.

SUMMARY

Consistent with the present disclosure, there provided a transaction device for conducting a transaction, comprising: a network controller for establishing a communication link to a server system; an infrared array configured to display images; at least one processor; and a storage medium storing instructions that, when executed, configure the at least one processor to perform operations comprising: generating a first image; displaying the first image via the infrared array for a predetermined duration of time; receiving, via the communication link, a confirmation that a user device has entered a paired state with the transaction device based on the user device scanning the first image; receiving, via the communication link, authentication data indicating that the paired user device has been authorized to complete the transaction; completing the transaction, the transaction comprising at least one of withdrawing or depositing funds; and terminating the pairing with the user device by causing the user device to enter an unpaired state.

Also consistent with the present disclosure, there is provided A method for conducting a transaction on a transaction device, comprising: generating a first image; displaying the first image via an infrared array for a predetermined duration of time; receiving, via a communication link to a server system, a confirmation that a user device has entered a paired state with the transaction device based on the user device scanning the first image; receiving, via the communication link, authentication data indicating that the paired user device has been authorized to complete the transaction; completing the transaction, the transaction comprising at least one of withdrawing or depositing funds; and terminating the pairing with the user device by causing the user device to enter an unpaired state.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

References will now be made in detail to exemplary embodiments, discussed with references to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
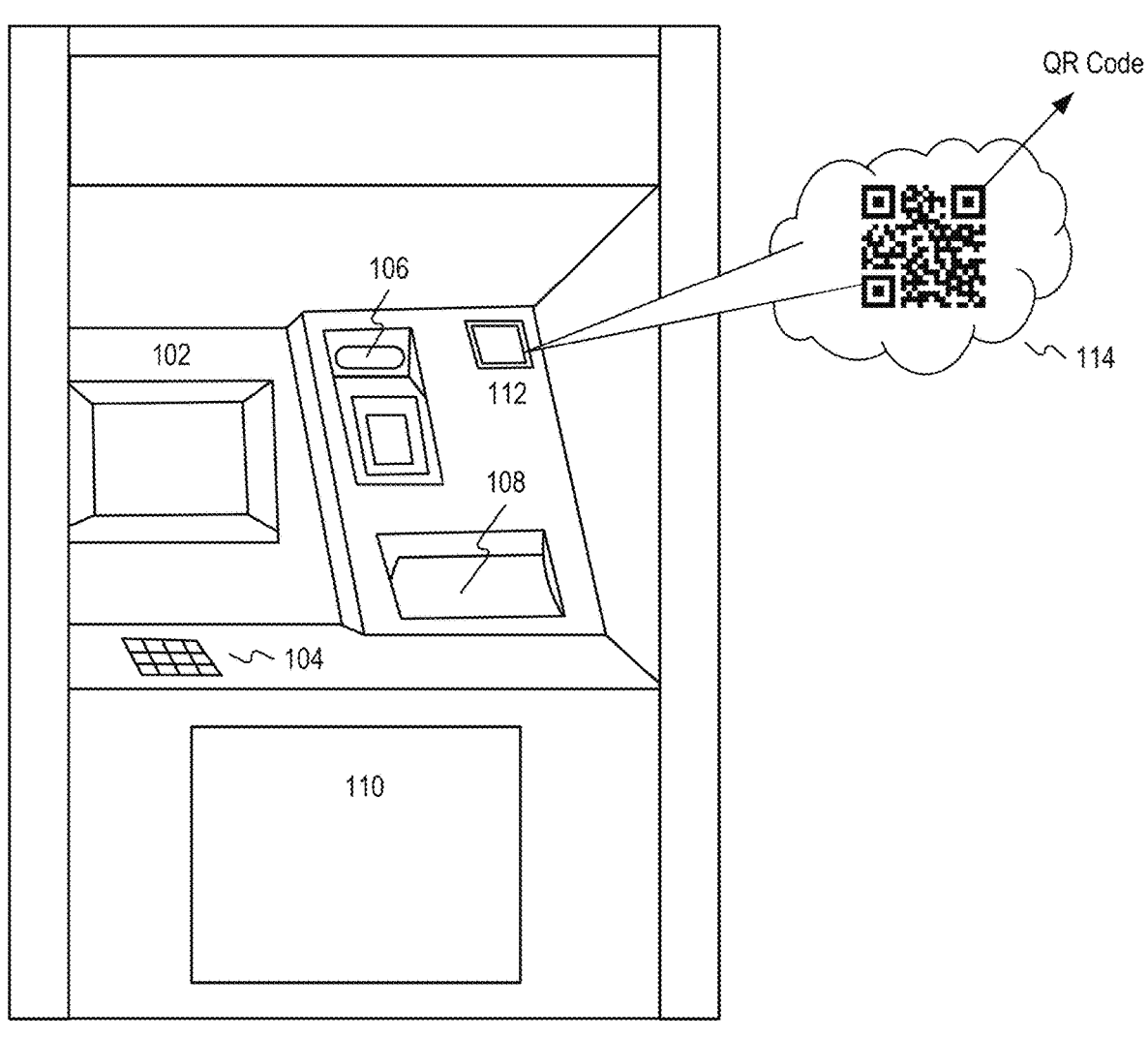
FIG. 1 is a diagram of an exemplary transaction device, consistent with disclosed embodiments.

FIG. 1 shows a diagram of an exemplary transaction device 100, consistent with disclosed embodiments. The transaction device 100 may be an apparatus or location at which physical items are withdrawn or deposited as part of a "transaction." For example, the transaction device 100 may be a cash depositing and withdrawing apparatus. In the non-limiting embodiment, the transaction device 100 is an automatic teller machine having an infrared (IR) array 112, one or more display interface(s) 102, a keypad 104, a card reader 106, a deposit slit 108, and a cash slot 110. In some embodiments, the IR array 112 outputs a "Quick Response" (QR) code 114 in IR spectrum. The IR array 112 may be an LED array or similar light source that outputs an image of the QR code 114. The display interface 102 may display instructions and account information to a user during the transaction. The keypad 104 receives inputs from the user to facilitate the completion of the transaction. The card reader 106 may allow the transaction device 100 to interact with a transaction card such as an ATM card or a debit card. The deposit slit 108 receives cash from the user, and the cash slot 110 dispenses cash to the user. A skilled person will now appreciate that the transaction device may lack one or more of the display interface(s) 102, the keypad 104 and/or the card reader 106. Moreover, a skilled person will now appreciate that the deposit slit 108 and the cash slot 110 may be combined into a single mechanism by which cash may be both deposited and dispensed.

The QR code 114 is a matrix barcode for encoding information in one or more of four standardized encoding modes—matrix, alphanumeric, byte/binary, and/or Kanji (i.e., Japanese characters). The QR code 114, which is two-dimensional, may hold approximately 100 times more information than traditional one-dimensional barcodes such as UPCs. In some embodiments, the QR code 114 may be a dynamic QR code. A dynamic QR code is a QR code which may be an image that contains an intermediate address that may direct the user to different final addresses. For example, while a QR code image is fixed to a specific intermediate address, different final addresses may be coded to the specific intermediate address. Therefore, multiple different data stored at different addresses may be accessed with a single QR code. In some embodiment, the final address may be edited after the QR Code has been created, thereby extending the useful life of the single QR code. Additionally, or alternatively, the QR code may be a spoof proof QR code.

In some alternative embodiments, different types of 2D or 3D infrared images may be implemented in place of, or in addition to, the QR code 114. For example, a bar code matrix may be displayed by the IR array 112. Moreover, the IR display 112 may display animation or video images in the infrared spectrum in place of the QR code 114. A skilled person will now appreciate that images, animations, videos, or display matrices that can be displayed in the infrared spectrum, formatted to contain accessible information, and scannable by an imaging device, may be implemented in place of, or in additions to, QR codes, consistent with the present disclosure.

Figure 2:
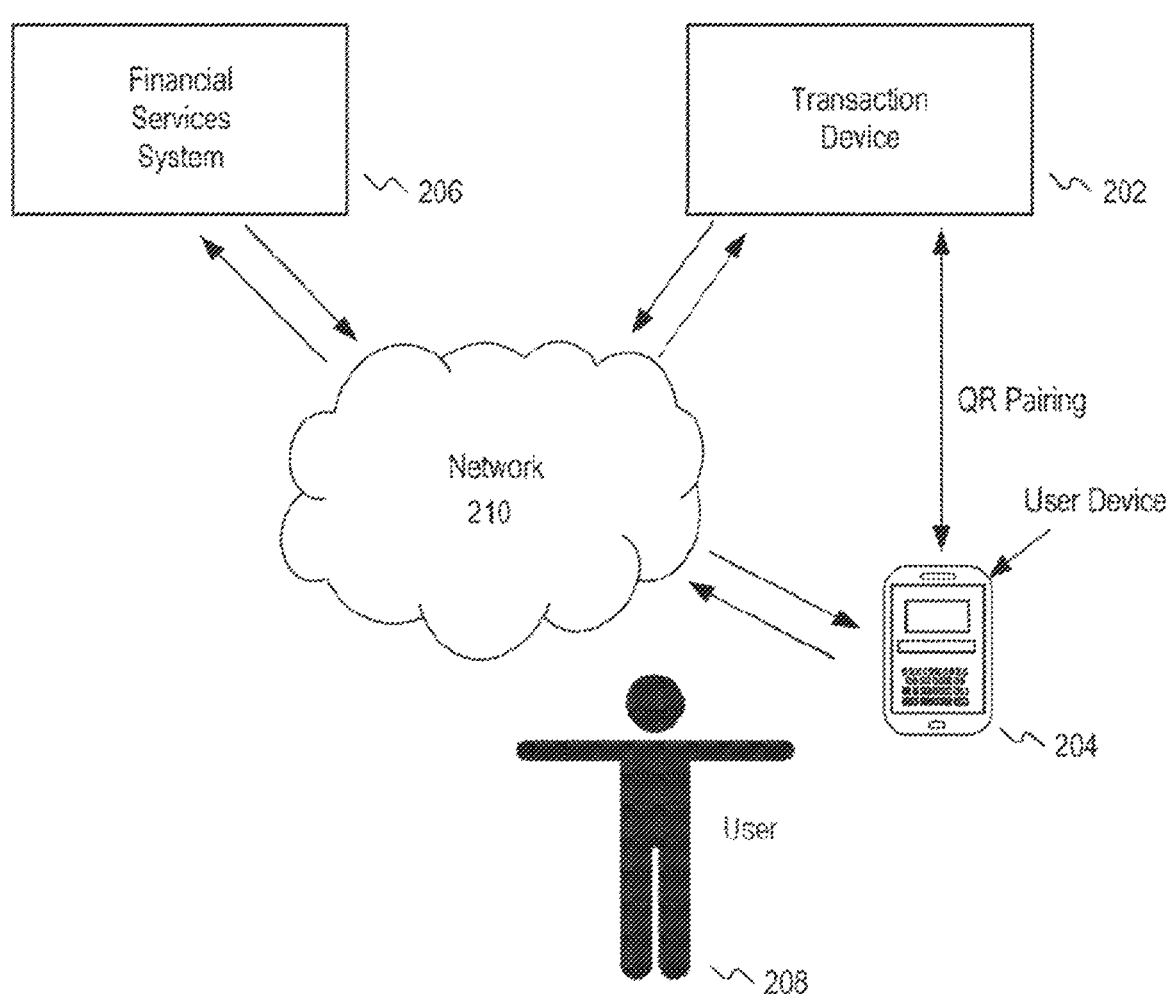
FIG. 2 is a diagram of an exemplary transaction system, consistent with disclosed embodiments.

In accordance with disclosed embodiments, the transaction device 100 may be part of a transaction system 200 illustrated in FIG. 2. Transaction system 200 including a financial services system 206, a transaction device 202, and a user device 204 belonging to a user 208, all connected by a network 210. The transaction device 202 corresponds to the transaction device 100 shown in FIG. 1.

The financial services system 206 may be one or more system associated with a financial service provider such as a bank, a credit card company, a lender, brokerage firm, or any other type of financial service entity that generates, provides, manages, and/or maintains financial service accounts, etc., for one or more users. The financial services system 206 may be one or more computing systems that are configured to execute software instructions stored on one or more memory devices to perform one or more operations consistent with the disclosed embodiments. For example, the financial services system 206 may include one or more memory device(s) storing data and software instructions and one or more processor(s) configured to use the data and execute the software instructions to perform server based functions and operations known to those skilled in the art. The financial services system 206 may include one or more general purpose computers, mainframe computers, or any combination of these types of components.

In certain embodiments, the financial services system 206 may be configured as a particular apparatus, system, and the like based on the storage, execution, and/or implementation of the software instructions that perform one or more operations consistent with the disclosed embodiments. The financial services system 206 may be standalone, or it may be part of a subsystem, which may be part of a larger system. For example, the financial services system 206 may represent distributed servers that are remotely located and communicate over a network (e.g., the network 210) or a dedicated network, such as a LAN, for a financial service provider. An exemplary computing system 300 consistent with the financial services system 206 is discussed in detail below with respect to FIG. 3.

The financial services system 206 may include or may access one or more storage devices configured to store data and/or software instructions used by one or more processors of the financial services system 206 to perform operations consistent with disclosed embodiments. For example, the financial services system 206 may include memory configured to store one or more software programs that performs several functions when executed by a processor. The disclosed embodiments are not limited to separate programs or computers configured to perform dedicated tasks. For example, the financial services system 206 may include memory that stores a single program or multiple programs. Additionally, the financial services system 206 may execute one or more programs located remotely from the financial services system 206. For example, the financial services system 206 may access one or more remote programs stored in memory included with a remote component that, when executed, perform operations consistent with the disclosed embodiments. In certain aspects, the financial services system 206 may include server software that generates, maintains, and provides services associated with financial account management. In other aspects, the financial services system 206 may connect separate server(s) or similar computing devices that generate, maintain, and provide services associated with financial data for a financial service provider associated with the financial services system 206.

The transaction system 200 may also include one or more transaction devices 202, corresponding to the transaction device 100, which, for example, may be Automatic Teller Machines ("ATMs") or other cash dispensing devices described previously. The transaction device 202 may include one or more memory device(s) that store data that may be used for performing one or more processes consistent with the disclosed embodiments. In certain aspects, the transaction device 202 may additionally, or alternatively, include one or more computer devices. For example, the transaction device 202 may include one or more memory device(s) storing data and software instructions and one or more processor(s) configured to use the data and execute the software instructions to perform computing functions and operations known to those skilled in the art.

The transaction device 202 may further include computer device(s) that are configured to execute stored software instructions to perform operations associated with completing a transaction, including one or more processes associated with generating and displaying QR codes in the IR spectrum. The transaction device 202 may include one or more computer device(s) that may be a general purpose computer, server, mainframe computer, or any combination of these components. In certain embodiments, the transaction device 202 (or a system including the transaction device 202) may be configured as a particular apparatus, system, and the like based on the storage, execution, and/or implementation of the software instructions that perform one or more operations consistent with the disclosed embodiments. The transaction device 202 may be standalone, or it may be part of a subsystem, which may be part of a larger system. For example, the transaction device 202 may represent distributed servers that are remotely located and communicate over a network (e.g., network 210) or a dedicated network, such as a LAN. An exemplary computer system consistent with the transaction device 202 is discussed in detail below with respect to FIG. 3. In certain embodiments, a third party may operate the components associated with the transaction device 202. Additionally or alternatively, the transaction device 202 may be a part or subpart of the financial services system 204.

Figure 10:
FIG. 10 is an exemplary interface displayed on a user mobile device, consistent with disclosed embodiments.
Figure 10:
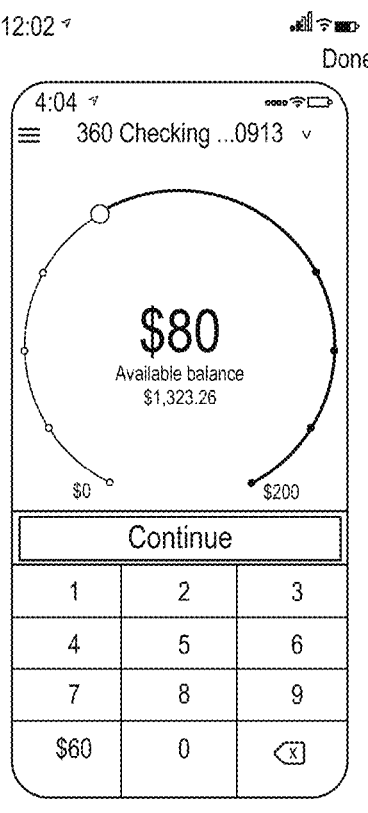

The transaction system 200 may further include one or more user devices 204. User 208 may operate the user device 204, which may be a laptop, tablet, smartphone, multifunctional watch, pairs of multifunctional glasses, tracking device or any suitable device with computing capability. The user device 204 has one or image capturing components for capturing the QR code 114. For example, one or more cameras, dedicated QR scanners, or any suitable sensors capable of imaging in the IR spectrum may be used to capture the QR code 114. The user device 204 may include one or more processor(s) and memory device(s) known to those skilled in the art. For example, the user device 204 may include memory device(s) that store data and software instructions that, when executed by one or more processor(s), perform operations consistent with the disclosed embodiments. In one aspect, the user device 204 may have a financial application installed thereon, which may enable the user device 204 to communicate with financial services system 206 via the network 210. For instance, the user device 204 may be a smartphone or tablet (or the like) that executes a stored mobile application that performs online banking operations. In other embodiments, the user device 204 may connect to the financial services system 206 through use of browser software stored on and executed by the user device 204. The user device 204 may be configured to execute software instructions to allow a user to access information stored in the financial services system 206, such as, for example, financial information related to purchase transactions, financial statements, account information, rewards program information, and the like. Additionally, the user device 204 may be configured to execute software instructions that initiate and conduct transactions with the transaction device 202. For example, the user device 204 may be a mobile phone having an application stored thereon to allow for staging and completion of a financial transaction. A non-limiting example of the application may be "Cash Tap" illustrated in FIG. 10. "Cash Tap" allows the user 208 to access financial accounts and a stage financial transaction on the user device 204, and then complete the staged transaction at the transaction device 202. This transaction process will be described later in further detail.

Figure 3:
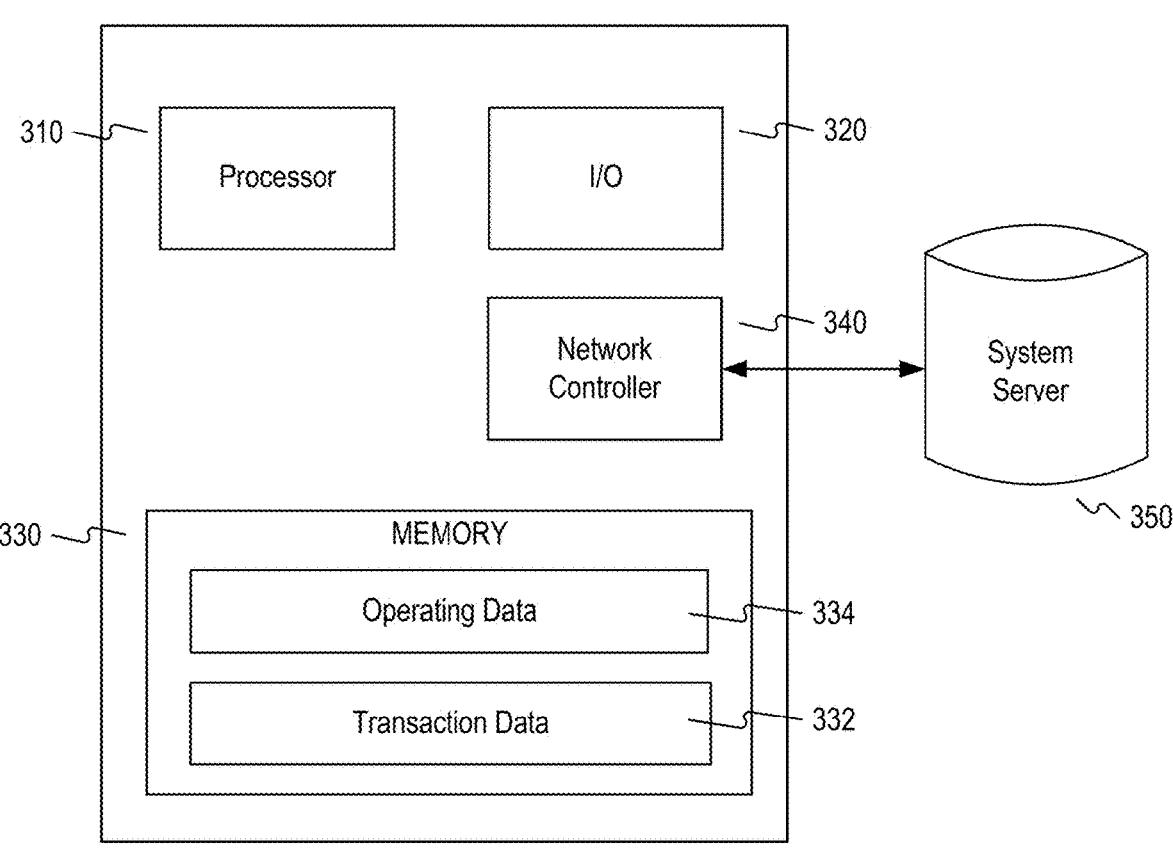
FIG. 3 is a diagram of an exemplary computer system, consistent with disclosed embodiments.

FIG. 3 shows a diagram of an exemplary computing system 300 illustrating a computing system configuration that may be configured to serve as the transaction device 100 or 202, the financial services system 206, the user device 204, and/or any additional computer server system consistent with disclosed embodiments. In one embodiment, the computing system 300 includes one or more processors 310, one or more input/output (I/O) devices 320, one or more memories 330, and a network controller 340. In some embodiments, the computing system 300 may take the form of a server, general purpose computer, a mainframe computer, a laptop, a smartphone, a mobile device, or any combination of these components. In certain embodiments, the computing system 300 (or a system including computing system 300) may be configured as a particular apparatus, system, and the like based on the storage, execution, and/or implementation of the software instructions that perform one or more operations consistent with the disclosed embodiments. The computing system 300 may be standalone, or it may be part of a subsystem, which may be part of a larger system.

The processor(s) 310 may include one or more known processing devices, such as a microprocessor from the Pentium™ or Xeon™ family manufactured by Intel™, the Turion™ family manufactured by AMD™, or any of various processors manufactured by Sun Microsystems. The processor(s) 310 may constitute a single core or multiple core processor that executes parallel processes simultaneously. For example, the processor(s) 310 may be a single core processor configured with virtual processing technologies. In certain embodiments, the processor(s) 310 may use logical processors to simultaneously execute and control multiple processes. The processor(s) 310 may implement virtual machine technologies, or other known technologies to provide the ability to execute, control, run, manipulate, store, etc. multiple software processes, applications, programs, etc. In another embodiment, the processor(s) 310 may include a multiple-core processor arrangement (e.g., dual, quad core, etc.) configured to provide parallel processing functionalities to allow the computing system 300 to execute multiple processes simultaneously. A skilled person in the art would understand that other types of processor arrangements could be implemented that provide for the capabilities disclosed herein. The disclosed embodiments are not limited to any type of processor(s) configured in the computing system 300.

The memory 330 may include one or more storage devices configured to store instructions used by the processor(s) 310 to perform functions related to the disclosed embodiments. For example, the memory 330 may be configured with one or more software instructions, such as program(s) that may perform one or more operations when executed by the processor(s) 310. The disclosed embodiments are not limited to separate programs or computers configured to perform dedicated tasks. For example, the memory 330 may include a program or multiple programs that perform the functions of computing system 300. Additionally, the processor(s) 310 may execute one or more programs located remotely from the computing system 300. For example, the transaction device 100 or 202, the financial services system 206, or the user device 204 may be implemented via the computing system 300 (or variants thereof), and access one or more remote programs that, when executed, perform functions related to certain disclosed embodiments.

The processor 310 may further execute the one or more programs located in the database 350. In some embodiments, the programs may be stored in an external storage device, such as a cloud server located outside of computing system 300, and the processor(s) 310 may execute the programs remotely. In some embodiments, the computer system 300 accesses the database 350 via the network controller 340. The network controller 340 may be one or more modem/router units, or any hardware or software that connects the computer system 300 to the network 210.

The programs executed by the processor(s) 310 may cause the processor(s) 310 to execute one or more processes related to financial services provided to users including, but not limited to, cash deposits and withdrawals, processing credit and debit card transactions, checking transactions, transferring money between financial accounts, lending loans, processing payments for credit card and loan accounts, processing orders for certified funds, and processing orders for new or reissue debit cards.

Memory 330 may also store data that reflects any type of information in any format that the computer system 300 may use to perform operations consistent with the disclosed embodiments. Memory 330 may store instructions to enable the processor(s) 310 to execute one or more applications, such as server applications, network communication processes, and any other type of application or software. Alternatively, the instructions, application programs, etc., may be stored in an external storage (not shown) in communication with the computing system 300 via the network 210 or any other suitable network. Memory 330 may be a volatile or non-volatile, magnetic, semiconductor, tape, optical, removable, non-removable, or other type of storage device or tangible (i.e., non-transitory) computer-readable medium.

Memory 330 may include transaction data 332. Transaction data 332 may include information related to financial transactions initiated by the user 208. For example, transaction data may include a user identifier and a transaction type. The user identifier may be a credit or debit card number, an account number, or another means for identifying the user initiating the financial transaction. The transaction type may include an indicator of the type of transaction the user is initiating, such as, cash withdrawal/deposit, debit PIN reset, money wire or transfer, call to a customer service center, ordering a new or reissue debit card, ordering certified funds, or other transactions requiring user authentication. Transaction data 332 may also include authentication data obtained from the user 208 for the purposes of authorizing access to the financial accounts. Additionally or alternatively, transaction data 332 may be stored in the database 350 or in an external storage (not shown) in communication with computing system 300 via network 210 or any other suitable network.

Memory 330 may further include operating data 334. The operating data 334 includes information about the state of the transaction device 100 or 202. For example, the operating data 334 may include the transaction device 100 location data, total cash availability, total availability of individual denomination notes, history of transactions. Additionally, the operating data 334 may include device diagnostic information, such as IP address, Bluetooth signature, past QR codes generated, error log or other device diagnostic information of the transaction device 100. Alternatively the operating data 334 may be stored in the database 350, or in an external storage (not shown) in communication with the computing system 300 via the network controller 340 via the network 210 or any other suitable network.

The processor(s) 310 may analyze the transaction data 332 in reference to the operating data 334. For example, processor(s) 310 may analyze the transaction data 332 to determine whether the transaction can be completed at the transaction device 100 based on the operating data 334.

The I/O devices 320 may be one or more device that are configured to allow data to be received and/or transmitted by the computing system 300. The I/O devices 320 may include one or more digital and/or analog communication devices that allow the computing system 300 to interact with the user 208. For example, on the transaction device 100, the I/O devices 320 may represent the display 102 and the key pad 104. In another example, the I/O devices 320 may represent a touch screen, microphone or speaker on the user device 204.

The computing system 300 may also contain one or more database(s) 350. Alternatively, the computing system 300 may be communicatively connected to one or more database(s) 350. The computing system 300 may be communicatively connected to the database(s) 350 through the network 210. The database 350 may include one or more memory devices that store information and are accessed and/or managed through computing system 300. By way of example, the database(s) 350 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. The database 350 may include computing components (e.g., database management system, database server, etc.) configured to receive and process requests for data stored in memory devices of database(s) 350 and to provide data from database 350.

Other components known to one of ordinary skill in the art may be included in system 100 to process, transmit, provide, and receive information consistent with the disclosed embodiments.

Figure 4:
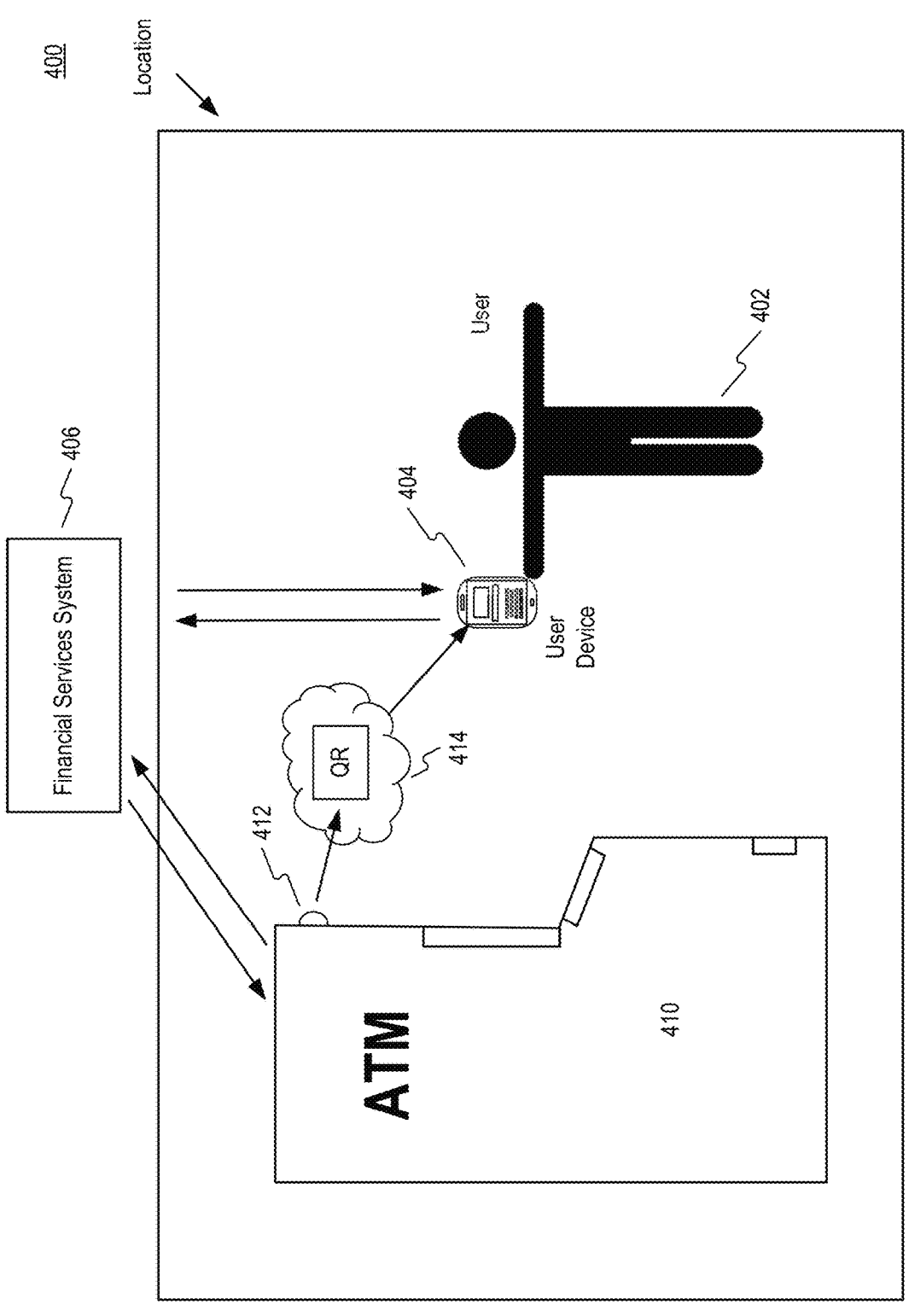
FIGS. 4-6 are diagrams of exemplary processes for completing a transaction in various settings, consistent with disclosed embodiments.

FIG. 4 illustrates a non-limiting embodiment of a transaction device carrying out a transaction at location 400. An ATM 410 represents the transaction device 100. The ATM 410 includes the computer system 300 as discussed above, and a LED array 412 for displaying QR codes 414. The LED array 412 represents one embodiment of the IR array 112. The QR codes 414 are embodiments of the QR code 114. The ATM 410 is communicatively linked with a financial services system 406. A user 402 having a user device 404 correspond to the user 208 and the user device 204, respectively. The location 400 may be a local branch of a financial service provider such as a bank, a credit card company, a lender, brokerage firm, or any other type of financial service entity. In other embodiments, the location 400 may be location where ATMs or other cash dispensing devices are installed. For example, the location 400 may be a point-of-sale location such as a cash register at a store that may be associated with a brick and mortar location that the user 402 may physically visit to purchase goods and/or services from a merchant.

The user device 404 is communicatively linked to the financial services system 406, which may represent the financial services system 206. The user device 404 may have a financial application installed thereon, which enables the user device 404 to communicate with the financial services system 406 via the network 210. The user device 404 may be configured to execute software instructions to allow the user 402 to access information stored in the financial services system 406, such as, for example, financial information related to transactions, financial statements, account information, rewards program information and the like associated with the user 402. Additionally, the user device 404 may be configured to execute software instructions that initiate and conduct transactions with the ATM 410, such transactions being described more fully below.

The ATM 410 may have a financial application installed thereon, which enables the ATM 410 to communicate with financial services system 406 via the network 210. The ATM 410 may be configured to execute software instructions to allow the ATM 410 to access information stored in the financial services system 406, such as, for example, financial information related to transactions, financial statements, account information, rewards program information and the like associated with the user 402. Additionally, the ATM 410 may be configured to execute software instructions that initiate and conduct transactions with the user device 404, such transaction being described more fully below.

In the exemplary embodiment, a pairing is established between the ATM 410 and the user device 404 when the user device 404 captures the QR code 414. The user device 404 may communicate to the financial services system 406 that the QR code 414 has been captured, and the financial services system 406 may in turn communicate to the ATM 410 that the QR codes 414 has been captured by the user device 404, to establish the pairing. In the exemplary embodiment, no direct communicative link between the ATM 410 and the user device 404 is established. The paring will be described below.

Figure 5:
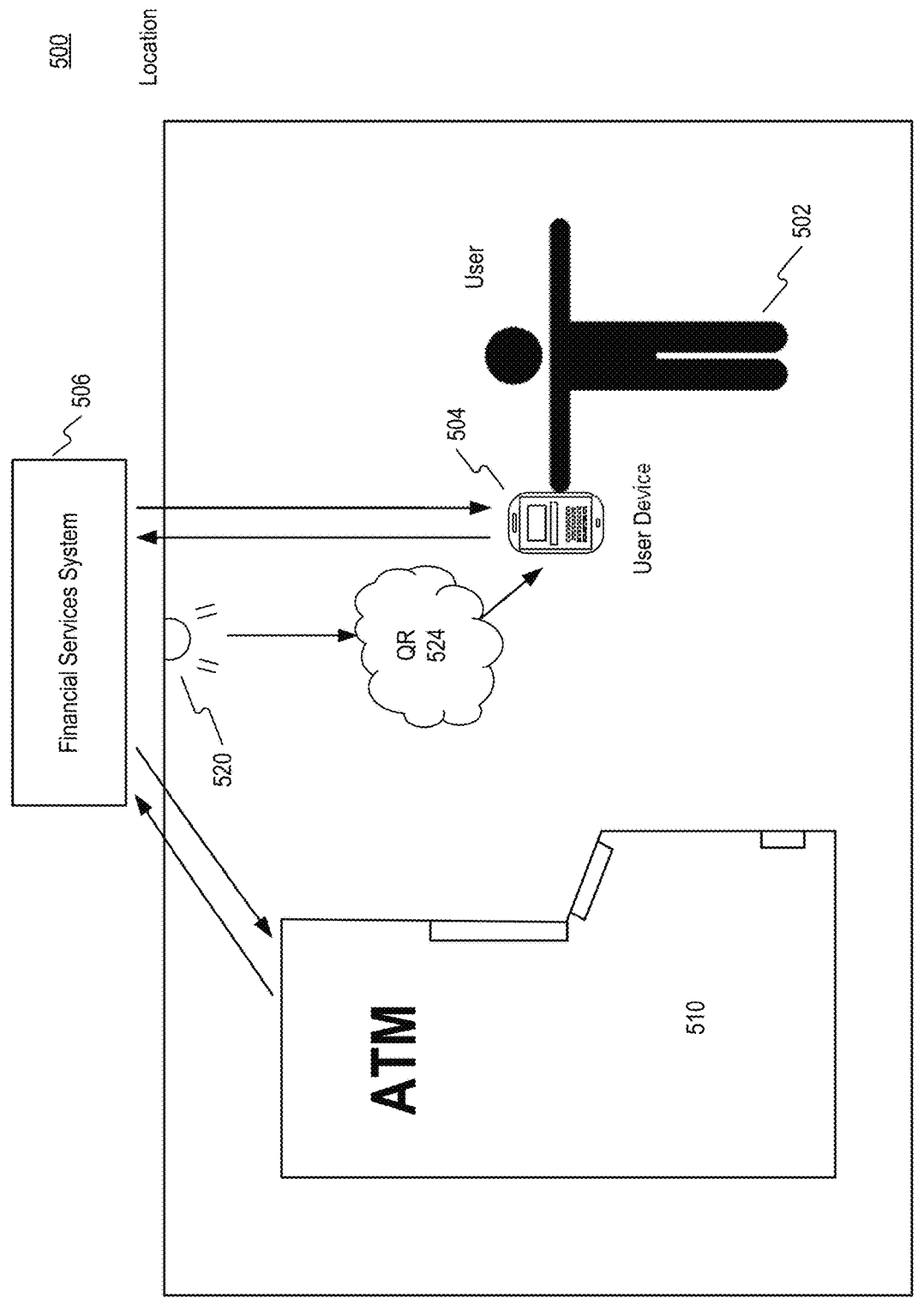

FIG. 5 illustrates an alternative non-limiting embodiment of the transaction device 100 carrying out a transaction at a location 500. An ATM 510 represents the transaction device 100. The ATM 510 includes the computer system 300 as discussed above. A LED array 520 for displaying QR codes 524 are installed at a location near the ATM 510. The LED array 520 represents an alternative embodiment of the IR array 112. The QR codes 524 may be different embodiments of the QR code 114. The ATM 510 is communicatively linked with a financial services system 506. A user 502 having a user device 504 correspond to the user 208 and the user device 204, respectively. The location 500 may be a local branch of a financial service provider such as a as a bank, a credit card company, a lender, brokerage firm, or any other type of financial service entity. In other embodiments, the location 500 may be location where ATMs or other cash dispensing devices are installed. For example, the location 500 may be a point-of-sale location such as a cash register at a store.

The user device 504 is communicative linked to the financial services system 506, which may represent the financial services system 206. The user device 504 may have a financial application installed thereon, which enables the user device 504 to communicate with financial services system 506 via the network 210. The user device 504 may be configured to execute software instructions to allow the user 502 to access information stored in the financial services system 506, such as, for example, financial information related to transactions, financial statements, account information, rewards program information and the like associated with the user 502. Additionally, the user device 504 may be configured to execute software instructions that initiate and conduct transactions with the ATM 510, such transactions being described more fully below.

The ATM 510 may have a financial application installed thereon, which enables the ATM 510 to communicate with financial services system 506 via the network 210. The ATM 510 may be configured to execute software instructions to allow the ATM 510 to access information stored in the financial services system 506, such as, for example, financial information related to transactions, financial statements, account information, rewards program information and the like associated with the user 502. Additionally, the ATM 510 may be configured to execute software instructions that initiate and conduct transactions with the user device 504, such transactions being described more fully below.

The LED array 520 may be communicative linked to the ATM 510. In the non-limiting example, the LED array 520 is placed on the ceiling of the location 500. A skilled person will now appreciate that the LED array 520 may be also located on a wall, or floor, or any location convenient for the user device 504 to capture the QR codes 524. The ATM 510, or other suitable embodiments of the transaction device 100, may not have a built in IR LED, and thus the present disclosure herein may be made compatible with these devices by using the LED array 520.

In the exemplary embodiment, a pairing is established between the ATM 510 and the user device 504 when the user device 504 captures the QR codes 524. The user device 504 may communicate to the financial services system 506 that the QR codes 524 have been captured, and the financial services system 506 may in turn communicate to the ATM 510 that the QR codes 524 have been captured by the user device 504, and establish the paring. In the exemplary embodiment, no direct communicative link between the ATM 510 and the user device 504 is established. The paring will be described more fully below.

Figure 6:
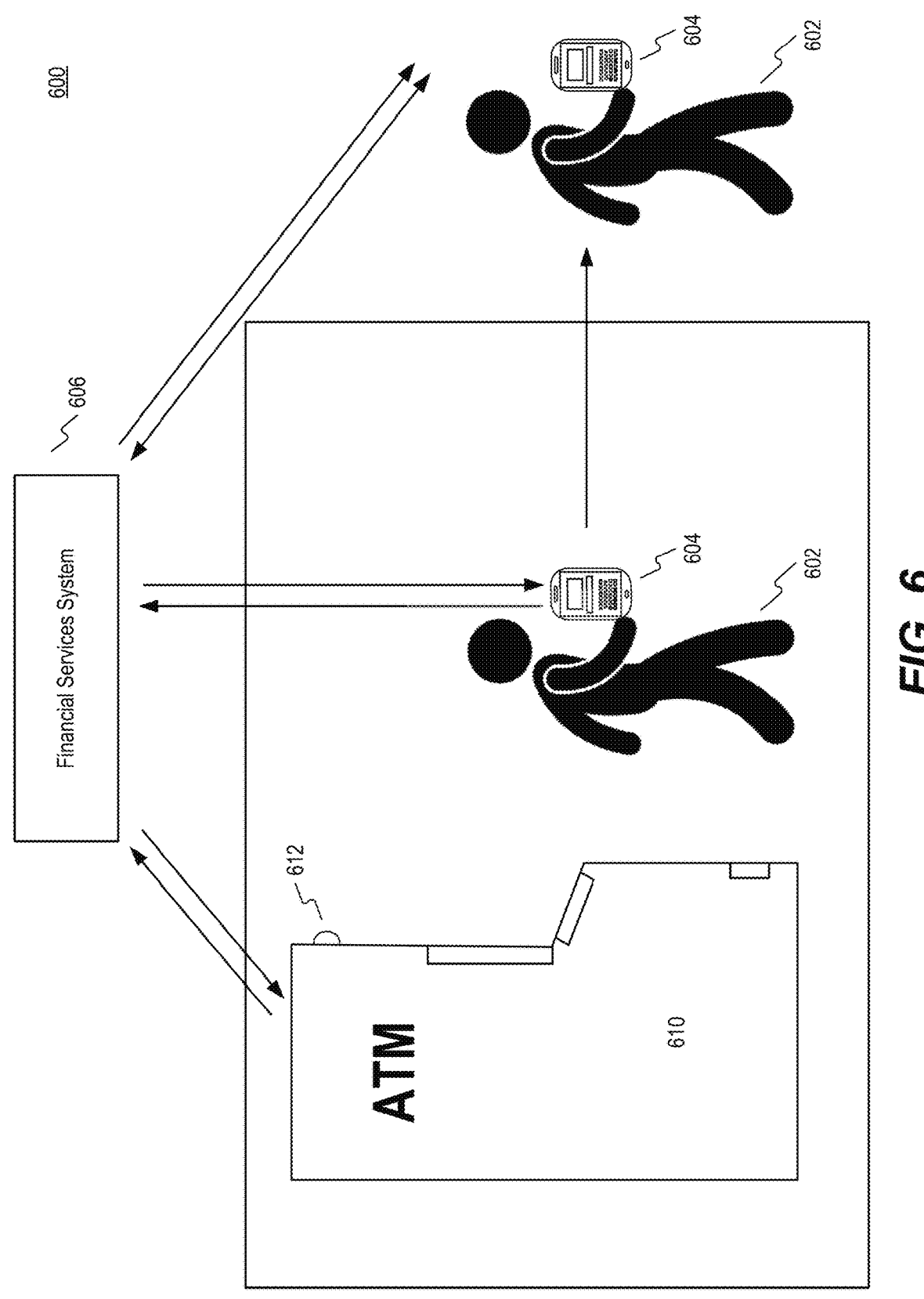

FIG. 6 illustrates a non-limiting embodiment of the transaction device 100 carrying out a transaction at a location 600 with a location proximity feature. An ATM 610 represents the transaction device 100. The ATM 610 includes the computer system 300 as discussed above, and a LED array 612 for displaying QR codes not illustrated in FIG. 6. The ATM 610 is communicative linked to the financial services system 606. A user 602 having a user device 604 correspond to the user 208 and the user device 206, respectively. The location 600 may be a local branch of a financial service provider such as a bank, a credit card company, a lender, brokerage firm, or any other type of financial service entity. In other embodiments, the location 600 may be a location where ATMs or other cash dispensing devices are installed. For example, the location 600 may be a point-of-sale location such as a cash register at a store.

The user device 604 is communicative linked to the financial services system 606, which may represent the financial services system 206. The user device 604 may have a financial application installed thereon, which enables the user device 604 to communicate with financial services system 606 via the network 210. The user device 604 may be configured to execute software instructions to allow the user 602 to access information stored in the financial services system 606, such as, for example, financial information related to transactions, financial statements, account information, rewards program information and the like associated with the user 602. Additionally, the user device 604 may be configured to execute software instructions that initiate and conduct transactions with the ATM 610, such transactions being described more fully below.

The ATM 610 may have a financial application installed thereon, which enables the ATM 610 to communicate with financial services system 606 via the network 210. The ATM 610 may be configured to execute software instructions to allow the ATM 610 to access information stored in the financial services system 606, such as, for example, financial information related to transactions, financial statements, account information, rewards program information and the like associated with the user 602. Additionally, the ATM 610 may be configured to execute software instructions that initiate and conduct transactions with the user device 604, such transactions being described more fully below.

In the exemplary embodiment of FIG. 6, the user device 604 has user location data, and the user device 604 transmits the user location data to the financial services system 606 via the network 210. The user location data may be, for example, GPS coordinates of the user device 604. A skilled person will now appreciate the user device 604 may further comprise a global positioning system capable of acquiring the GPS coordinates. Additionally, the ATM 610 may also contain ATM location data associated with the ATM 610. The ATM location data may be previously known to the financial services system 606, or alternatively, the ATM 610 may also comprise a global positioning system capable of acquiring the GPS coordinates of the ATM 610, and the ATM location data are communicated to the financial services system 606 over the network 210.

In some embodiments, the financial services system 606 may prevent a pairing between the ATM 610 and the user device 604 if it is determined that a location of the user device 604 is not within a predetermined geographic range of the ATM 610, at a time when the user device 604 captures the QR codes 614. Moreover, in some embodiments, the financial services system 606 may sever the pairing between the ATM 610 and the user device 604 if it determines that the user device 604 has moved to a different location that is not within a predetermined geographic range of the ATM 610.

A non-limiting example of a transaction consistent with the disclosed embodiments will be described with reference to FIG. 7. A process 700 is an example of a "staged" transaction. A "staged" transaction is one in which the user 208 completes one or more steps of a transaction prior to arrival at the transaction device 100. For example, the user 208 may have logged into the user's account, selected type and amount of transaction, and completed authentication all before being present at the transaction device 100. A skilled person will now appreciate that the process 700 may be staged on one user device, and a different user device may be used to complete the transaction at the transaction device 100. For example, the user 208 may stage a transaction on a desktop or a lap-top computer, while presenting a mobile phone at the transaction device 100 to complete the staged transaction.

In step 702, an identity of the user 208 must be authenticated such that accounts associated with the user 208 are protected from unauthorized use. For example, the processor 310 in the user device 204 may execute applications stored thereon to prompt the user 208 for an authentication credential such as a log-in/password combination/code via I/O devices 320. Additionally or alternatively, the user device may authenticate the user identity using biometric means such as fingerprints, iris scans, facial recognition or similar technology. In some embodiments, the authentication credentials may be stored locally on the user device 204, and the processor 310 requires authentication before the user 208 is allowed to access an application used for completing a transaction. In other embodiments, the processor 310 may cause the user device 204 to establish a communication link to the financial services system 206 over the network 210 and, in response, the financial services system 206 may require the user 208 to authenticate identity in order to access data and an application stored in the financial services system 206. The financial services system 206 may prompt the user 208 for an authentication credential such as a log-in/password combination/code. Additionally or alternatively, the user device 204 may authenticate the user identity using known biometric means such as fingerprints, iris scans, facial recognition or similar technology to access the financial services system 206. In some embodiments, the financial services system 206 may employ additional security such as a multi-factor authentication, by which the financial services system 206 transmit a confirmation code to the user device 204, prompting the user 208 to enter the code in order to access the financial services system 206. A skilled person will now appreciate that additional or alternative authentication methods known in the art may be employed to restrict access to the financial services system 206 or the user device 204.

In step 704, the user 208 selects a transaction type via the I/O devices 320 of the user device 204. The transaction type may be one of a withdrawal or a deposit. In some embodiment, the user 208 may specify a particular form of withdrawal or deposit. A skilled person will now appreciate that the withdrawal may be in the form of cash or other financial instruments such traveler's check or a cashier's check. A skill person will also now appreciate that deposit may be made in forms of cash, personal check, traveler's check, cashier's check or other suitable financial instruments. A skill person will further now appreciate that other transaction may be selected, such as accessing an account balance, transaction history, or other information that may be stored in the financial services system 206. For example, the user 208 may obtained a physical copy of the account balance or the transaction history at the transaction device 100.

In step 706, the user 208 may specify a transaction amount associated with the transaction via I/O devices 320. For example, the user 208 may specify the amount of money to be deposited or withdrawn.

In step 708, the user device 204 transmits the transaction amount to the financial services system 206 via the network 210. The financial services system 206 verifies that the transaction amount is allowed. In some embodiment, there may be a deposit or a withdrawal limit for the user 208. For example, the financial services provider may have a maximum deposit for certain types of financial instruments, such as personal checks, in order to deter fraud. In other examples, there may be a daily limit on the amount of cash withdrawal or deposit for security reasons. Additionally, the financial services system 206 must verify that the transaction amount is less than or equal to the account balance of the account associated with the user 208. For example, the financial services provider may disallow cash withdrawal of an amount that exceeds a current account balance of the user 208.

The financial services system 206 may reject the transaction amount specified and prompt the user device 204 to repeat step 706. The financial services system 206 may verify the transaction amount and prompt the user device 204 to proceed to step 710.

In step 710, the user 208 may select a specific method to complete the transaction. The selected method is transmitted to the financial services system 206. In some embodiments, if the user 208 wishes to withdraw cash, the user 208 may be prompted to select specific bill denominations via the I/O devices 320. For example, the user 208 may wish to withdraw $100, as one $20 bill, five $10 bills, four $5 dollars bills, and ten $1 bills. A skilled person will now appreciate that any combination of bills may be selected that equals the transaction amount specified. In other embodiments, the user 208 may select to collect the transaction amount in forms of financial instruments other than cash.

In step 712, the financial services system 206 may prompt the user 208 to confirm the staged transaction via the I/O devices 320 on the user device 204. In some embodiments, the financial services system 206 may require further authentication to complete the staged transaction, which may be the same or different from the authentication performed in step 702. In some embodiments, the financial services system 206 may transmit a confirmation to the user device 204 so that the user 208 is informed that the staged transaction is complete.

In step 714, the user 208 may bring a suitable user device, such as one capable of capturing the QR code 114 to the transaction device 100 to complete the transaction, which will be described in further detail below with references to FIG. 8.

Figure 8:
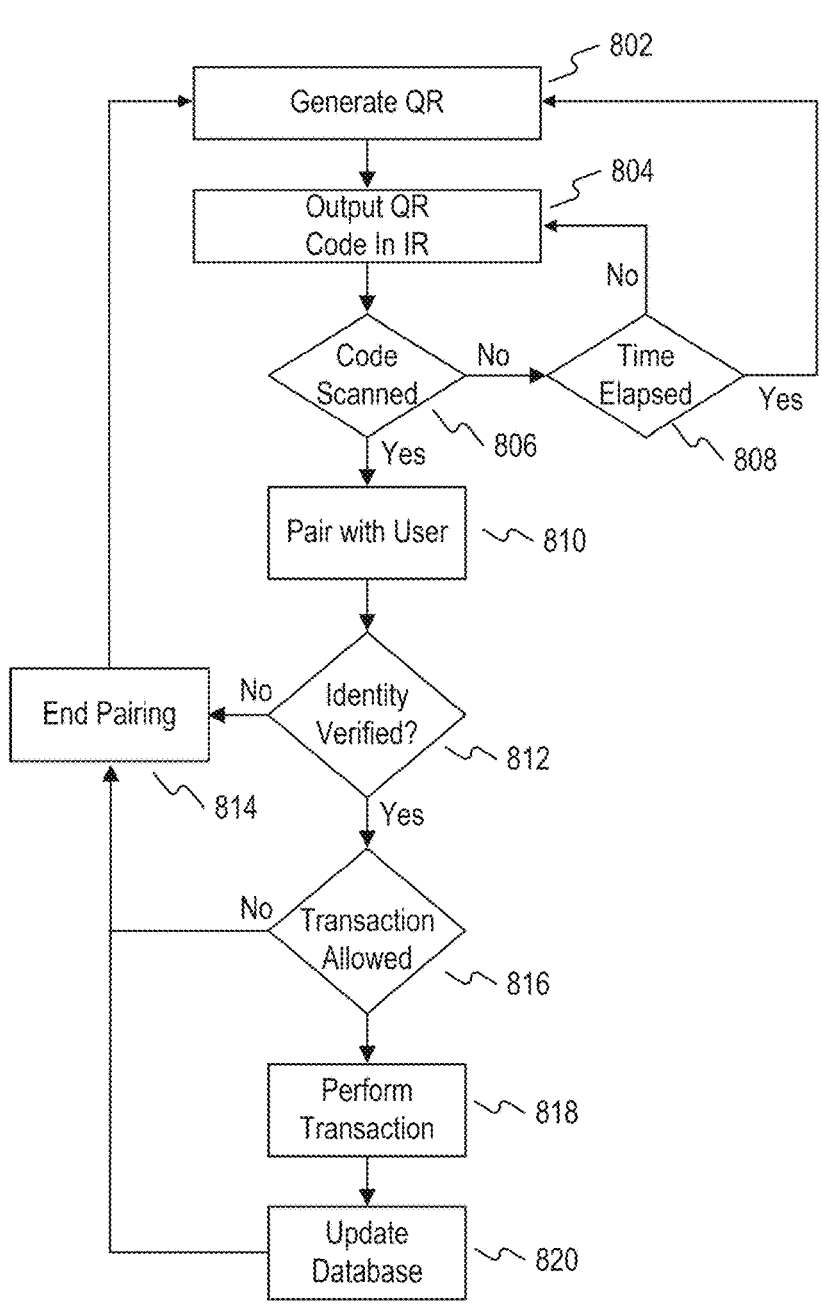

FIG. 8 illustrates a flow chart of one embodiment of a process 800 for completing a transaction at the transaction device 100 comprising the computer system 300. In step 802, the processor 310 executes an application that generates the QR code 114. The QR code 114 is unique to the transaction device 100 from which it is generated and helps to identify the transaction device 100 to user devices 204 that captures the QR code 114. Both the transaction device 100 and the user device 204 are initially in an unpaired state.

In step 804, the I/O devices 320 output the QR code 114 that is generated in step 802. In the exemplary embodiment, the I/O devices 320 may comprise built-in LED array 112 that is part of the transaction device 100, or a discrete element connected to the transaction device as illustrated in FIG. 5. The QR code 114 is outputted in the IR spectrum so that the QR code 114 is hidden from view. During testing of the exemplary embodiment, it was discovered that it was not necessary for the user 208 to see the QR code 114 in order to use the user device 204 to capture the image. Testing devices were able to capture the QR code 114 despite testers not being able to see the QR code 114. Moreover, there are several added benefits of hiding QR codes from view. For example, hiding QR codes adds an additional layer of security by hiding the QR code 114 from view, because it increases the difficulty of someone who may wish to intercept the QR code 114. Moreover, by hiding the QR code from view, it may prevent the user 208 from attempting to maneuver the user device 204 in an awkward manner while attempting to position the user device 204 to a "correct position." Instead, the user 208 will experience a "seamless" interaction.

In step 806, the user 208 having the user device 204 may be in close proximity to the transaction device 100 and want to conduct a transaction. In some embodiments, the transaction may be a staged transaction previously staged in process 700. If the user device 204 captures the QR code 114, the user device 204 identifies the transaction device 100 that generated the captured QR code 114 and transmits a notification via the network 210 to the financial services system 206 that it wishes to pair to the transaction device 100. The financial services system 206 in turn transmits notification to the transaction device 100 that the user device 208 has entered into pairing with the transaction device 100. Upon receiving the notification of the financial services system 206, the transaction device determines that "Code Scanned" to be "Yes" and proceeds to step 810. Both the transaction device 100 and the user device 204 have thus entered into a paired state.

If the QR code 114 has not been scanned, the transaction device 100 determines that "Code Scanned" is "No." The transaction device 100 then determine in step 808 if a predetermined time has elapsed. If the predetermined time has not elapsed, then the transaction device 100 continues to output the same QR code 114 and repeats step 804. If the predetermined time has elapsed, the transaction device 100 will generate a different QR code 114 and repeat step 802. In the exemplary embodiment, any particular QR code is time limited to improve security.

In step 810, the transaction device 100, while in the paired state, ceases outputting the QR code 114, which would prevent the transaction device 100 from pairing with other user devices.

In step 812, the transaction device 100 authenticates the identify of the user device 204. The financial services system 206 may require the user 208 to complete authentication using procedures substantially similar to those described above in step 702.

If authentication cannot be completed, "Identity Verified" is "No," and the transaction device 100 proceed to step 814 and the paring is ended. Process 800 repeats at step 802. Both the transaction device 100 and the user device 204 enter into the unpaired state.

If the authentication is successful, "Identity Verified" is "Yes," and the process proceeds to step 816.

In step 816, the financial services system 206 determine if the transaction is permitted to proceed. In some embodiments, the financial services system 206 must determine if there is any change to the account associated with the transaction since staging the transaction. For example, the financial services system 206 must verify that the account associated with the transaction still contains sufficient fund for the transaction, or that the limits of withdrawal or deposit are not exceeded by the transaction. A skilled person will now appreciate that verification in step 816 may be substantially similar to the verification in step 708 of process 700.

Additionally, or alternatively, the financial services system 206 receives the operating data 334 from the transaction device 100. The operating data 334 may contain the operating status of the transaction device 100, and the financial services system 206 may determine whether the transaction is allowed to proceed based on the received operating data 334. For example, based on the operating data 334, the financial services system 206 may determine that the transaction device 100 may not be capable of carrying out the staged transaction, because there is not sufficient cash in the transaction device 100 to complete a withdrawal transaction. In other examples, the transaction device 100 may not have the specific bill denominations required by the transaction, or that the transaction device 100 may not be capable of taking a deposit or producing the specific type of financial instruments that the user 208 wishes to obtain. It is advantageous to integrate as many different types of transaction devices into the transaction system 200 to provide users with as many locations as possible. Therefore, the financial services system 206 needs to be able to distinguish different types of transaction devices and their corresponding capability.

If the financial services system 206 determines that "Transaction Allowed" is "No," the process proceed to step 814, the pairing is ended by the transaction device 100, and the process repeats at step 802. If the financial services system 206 determines that "Transaction Allowed" is "Yes," process 800 proceed to step 818.

In step 818, the financial services system 206 transmits the data associated with the transaction to the transaction device 100, which may be contained in the transaction data 332. The transaction device 100 completes the transaction. For example, based on the transaction data, the transaction device 100 may dispense cash, produce financial instruments, provide print copies of account information, receive deposit, or any other transaction as staged in process 700. The transaction device 100 may provide notification to the financial services system 206 upon completion of the transaction, which may in turn notify the user device 204 of the completion of the transaction.

In step 820, the transaction device 100 updates the operating data 334 based on the transaction just completed. For example, the operating data 334 is updated with the new cash value currently stored in the transaction device 100 after a withdrawal or deposit. The process 800 then proceeds to step 814 to end the pairing with the user device 204 and repeat step 802.

A skilled person will now appreciate that the above process is merely a non-limiting example of the disclose embodiment. The inventive concept may be implemented with steps in different order. For example, in alternative embodiments, step 816 may be executed immediate after step 810, so that the user 208 is immediately notified if the transaction device 100 is not capable of handling the transaction.

Moreover, certain steps having been described as being carried out by the financial services system 206 may instead to carried out by the transaction device 100. For example, the transaction device 100 may be capable of obtaining transaction data 332 from the financial services system 206 and carrying out steps 816 locally. Alternatively, the transaction device 100 may be a simple cash dispensing kiosk, or a cash register, and step 816 is carried out by the financial services system 206.

Figure 9:
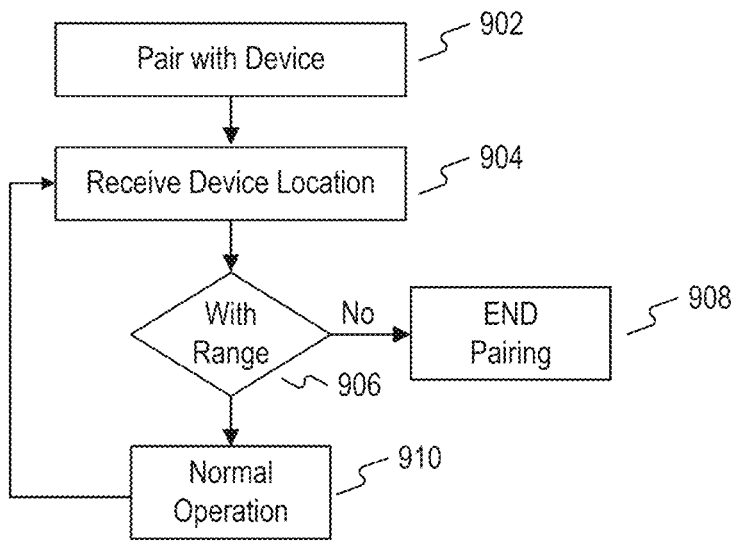

FIG. 9 illustrate a flow chart corresponding to some embodiments corresponding to FIG. 6. In some embodiments, the transaction system 200 may restrict the transaction device 100 to only complete the staged transaction based on location data of the user device 204.

In step 902, which correspond to step 810 in FIG. 8, the transaction device 100 establishes a paring with the user device 204. Both the transaction device 100 and the user device 204 enter into the paired state.

In step 904, the financial services system 206 receives the location data from the user device 204. The location data may be GPS coordinates of the user device 204. In some embodiments, the location data of the transaction device 100 may be previously known to the financial services system 206. Alternatively, the transaction device 100 may transmits its location data to the financial services system 206.

In step 906, the financial services system 206 determines, based on the received location data of the user device 204 and the known location data of the transaction device 100, whether the transaction device 100 and the user device 204 are within range of each other. For example, the financial services system 206 may establish a geofence around a location of the transaction device 100 and use the received location data of the user device 204 to determine if the user device 204 is within the geofence. Alternatively, the financial services system 206 may compare the location data of the transaction device 100 and the user device 204 to determine if they are within a predetermine distance of each other.

If the financial services system 206 determines that "Within Range" is "No," the transaction device 100 proceeds step 908 ending the pairing, causing the transaction device 100 and the user device 204 to enter into the unpaired state. Step 908 corresponds to step 814 in process 800. If the financial services system 206 determines that "Within Range" is "Yes," the transaction device proceed to step 910, which corresponds step 810 in process 800. Step 906 repeats until the pairing ends, when both the transaction device 100 and the user device 204 are in the unpaired state.

Figure 7:
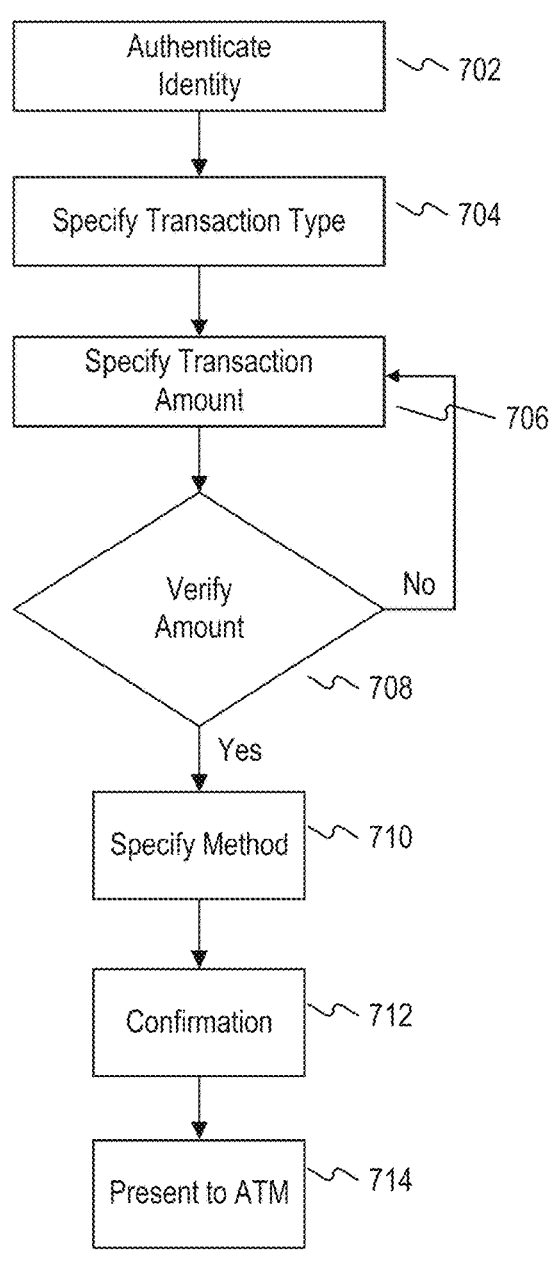
FIGS. 7-9 are flowcharts of exemplary processes for conducting and completing a transaction, consistent with disclosed embodiments.

The processes described in FIG. 7 and FIG. 8 are examples of a staged transaction. In other embodiments, the user 208 may skip the staging process 700 described in FIG. 7 and proceed directly to the transaction device to start process 800. For example, the user 208 may begin the transaction in step 806 by scanning the QR code 114. In this non-limiting example of a non-staged transaction, the financial services system 206 may cause the user device 204 to proceed directly to step 702 after step 810, and request that the user complete the process 700 before completing the transaction at the transaction device 100. In some embodiments, the financial services system 206 may direct the transaction device 100 to maintain the pairing while the user 208 completes the transaction on the user device 204. Alternatively, the financial services system 206 may determine that the transaction device 100 has I/O devices 320 capable of allowing the user 208 to complete the process 700 on the transaction device 100 instead of the user device 204. In other embodiments, the financial services system 206 may cause the transaction device 100 to sever the pairing so that the user 208 may complete transaction staging on the user device 204, thus allowing another user to interact with the transaction device 100 in the meantime.

It will be now appreciated that the transaction device 100 disclosed herein has several advantages. For example, given that mobile phones are ubiquitous, and that users often conduct financial transactions on their mobile phones, it is desirable to allow the users to conduct certain transactions, such as cash withdrawal or deposit using their mobile phones instead of traditional debit cards. In some applications, designers use wireless technologies such as Bluetooth or NFC to establish paring between the transaction device and various user devices. However, Bluetooth and NFC technologies require hardware that can be costly, which may be limiting if high numbers of legacy transaction devices need upgrade. Moreover, Bluetooth and NFC technologies require frequent updates that may be beyond the control of the financial services providers.

QR code technologies, in contrast, require relatively less expensive hardware to implement, and updates can be implemented relatively easily through simple software upgrade. Moreover, IR QR code provides an additional layer of security by hiding the QR code images from any potential hacker. IR QR codes also provide additional advantages since the QR images are hidden visually, and thus would not interfere with lighting or other design elements that may be associated with the location of the transaction device 100.

A skilled person will now appreciate that, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

In this description, the conjunction "and/or" may mean each of the listed items individual, a combination of the listed items, or both. Moreover, the "and/or" conjunction as used in this specification may include all combinations, sub-combinations, and permutations of listed items. For example, the phrase "A, B, and/or C" may mean each of A, B, and C individually, as well as A, B, and C together in addition to sub-groups A and B, A and C, and B and C. Unless specified otherwise, this example use of "and/or" may also intend to include all potential orders of items in each group and sub-group, such as B-C-A, B-A-C, C-A-B, C-B-A, and A-C-B, along with the subgroups C-B, B-A, and C-A.

Moreover, while illustrative embodiments have been described herein, the scope includes any and all embodiments having equivalent elements, modifications, omissions, combinations (e.g., aspects across various embodiments), adaptations, or alterations based on the present disclosure. The elements in the claims are to be interpreted broadly based on the language employed in the claims and not limited to examples described in the present specification or during the prosecution of the application, of which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A system for conducting secure transactions by pairing devices without direct communication, the system comprising: one or more processors; and one or more storage media storing instructions that, when executed, by the one or more processors perform operations comprising:

receiving, from a user device of a user, a first communication that includes an identifier of an automated teller machine and an indication that a QR code being displayed by the automated teller machine has been captured by the user device, wherein the QR code is unique to the automated teller machine and is used by the user device to identify the automated teller machine;

transmitting, to the user device, and based on receiving the first communication, a request to display a prompt for authentication credentials and authenticate the user based on received authentication credentials;

transmitting, to the automated teller machine associated with the identifier, a second communication indicating that the QR code has been captured by the user device and that the user device has entered a paired state, wherein the automated teller machine now prevents other user devices from pairing by ceasing display of the QR code based on the second communication;

receiving, from the automated teller machine, and based on the user device entering the paired state, information identifying a first location of the automated teller machine;

establishing, based on the first location of the automated teller machine, a geofence around the first location of the automated teller machine;

receiving, from the user device of the user, information identifying a second location of the user device;

determining, based on the second location of the user device being within the geofence around the first location of the automated teller machine, that a transaction is permitted to proceed;

transmitting, to the automated teller machine, and based on determining that the transaction is permitted to proceed, one or more instructions to perform the transaction, wherein the instructions comprise transaction data for performing the transaction; and causing, based on the transaction being completed, the paired state between the user device and the automated teller machine to be terminated.

2. The system of claim 1, wherein the operations further comprise:

receiving, from a different user device of the user, staged transaction data requesting that a staged transaction be executed when the user device is paired with the automated teller machine;

generating, based on the staged transaction data, the transaction to be executed when the user device is paired with the automated teller machine; and storing the transaction.

3. The system of claim 2, wherein determining that the transaction is permitted to proceed comprises:

accessing a financial account of the user; and determining whether changes to the financial account of the user after the staged transaction was requested enable the transaction to be completed.

4. The system of claim 2, wherein determining that the transaction is permitted to proceed comprises:

accessing operating data of the automated teller machine; and determining whether changes in the operating data after the staged transaction was requested enable the transaction to be completed.

5. The system of claim 2, wherein the operations further comprise:

terminating the paired state between the user device and the automated teller machine when the second location of the user device moves outside the geofence surrounding the automated teller machine.

6. The system of claim 1, wherein the operations further comprise:

receiving, directly from the user device, a location of the user device;

determining, based on the second location of the user device, that the user device is outside of the geofence associated with the automated teller machine; and refraining from pairing the user device and the automated teller machine until the second location of the user device matches the geofence associated with the automated teller machine.

7. A method for conducting secure transactions by pairing devices without direct communication, the method comprising:

receiving, from a user device of a user, a first communication that includes an indication that a QR code being displayed by an automated teller machine has been captured by the user device, wherein the QR code is unique to the automated teller machine and is used by the user device to identify the automated teller machine;

transmitting, to the user device, and based on receiving the first communication, a request to display a prompt for authentication credentials and authenticate the user based on received authentication credentials;

transmitting, to the automated teller machine, a second communication indicating that the QR code has been captured by the user device and that the user device has entered a paired state, wherein the automated teller machine now prevents other user devices from pairing by ceasing display of the QR code based on the second communication;

receiving, from the automated teller machine, and based on the user device entering the paired state, information identifying a first location of the automated teller machine;

establishing, based on the first location of the automated teller machine, a geofence around the first location of the automated teller machine;

receiving, from the user device of the user, information identifying a second location of the user device;

determining, based on the second location of the user device being within the geofence around the first location of the automated teller machine, that a transaction is permitted to proceed;

transmitting, to the automated teller machine, and based on determining that the transaction is permitted to proceed, one or more instructions to perform the transaction, wherein the one or more instructions comprise transaction data for performing the transaction; and causing, based on the transaction being completed, the paired state between the user device and the automated teller machine to be terminated.

8. The method of claim 7, further comprising:

receiving, from a different user device of the user, staged transaction data requesting that a staged transaction be executed when the user device is paired with the automated teller machine;

generating, based on the staged transaction data, the transaction to be executed when the user device is paired with the automated teller machine; and storing the transaction.

9. The method of claim 8, wherein determining that the transaction is permitted to proceed further comprises:

accessing a financial account of the user; and determining whether changes to the financial account of the user after the staged transaction was requested enable the transaction to be completed.

10. The method of claim 8, wherein determining that the transaction is permitted to proceed further comprises:

accessing operating data of the automated teller machine; and determining whether changes in the operating data after the staged transaction was requested enable the transaction to be completed.

11. The method of claim 8, further comprising:

terminating the paired state between the user device and the automated teller machine when the second location of the user device moves outside the geofence surrounding the automated teller machine.

12. The method of claim 7, further comprising:

determining, based on the second location of the user device, that the user device is outside of the geofence; and refraining from pairing the user device and the automated teller machine until the second location of the user device matches the geofence associated with the automated teller machine.

13. One or more non-transitory computer-readable media storing instructions thereon that when executed by one or more processors perform operations comprising:

capturing, at a user device, a QR code being displayed by an automated teller machine, wherein the QR code is unique to the automated teller machine and is used by the user device to identify the automated teller machine;

identifying the automated teller machine using the QR code;

transmitting, to a server, a first communication that includes an identifier of the automated teller machine and an indication that the QR code being displayed by the automated teller machine has been captured by the user device;

receiving, from the server, a request to display a prompt for authentication credentials;

authenticating a user based on the prompt;

transmitting, to the server, a second communication indicating that the user device has entered a paired state, wherein the automated teller machine now prevents other user devices from pairing by ceasing display of the QR code based on the second communication;

transmitting, to the server, and based on the user device entering the paired state, information identifying a first location of the automated teller machine;

establishing, based on the first location of the automated teller machine, a geofence around the first location of the automated teller machine;

transmitting, to the server, information identifying a second location of the user device;

determining, based on the second location of the user device being within the geofence around the first location of the automated teller machine, whether a transaction is permitted to proceed;

transmitting, to the automated teller machine, and based on determining that the transaction is permitted to proceed, one or more instructions to perform the transaction, wherein the instructions comprise transaction data for performing the transaction; and terminating, based on a transaction being completed, the paired state between the user device and the automated teller machine.

14. The one or more non-transitory computer-readable media of claim 13, wherein the operations further comprises:

receiving staged transaction data from the user operating the user device; and transmitting, to the server, the staged transaction data requesting that a staged transaction be executed when the user device is paired with the automated teller machine.

15. The one or more non-transitory computer-readable media of claim 13, wherein the user device comprises an infrared spectrum sensor for detecting infrared QR codes.

16. The one or more non-transitory computer-readable media of claim 15, wherein the instructions for capturing the QR code comprises instructing the infrared spectrum sensor to initiate QR code detection.

17. The system of claim 1, wherein the operations further comprise:

causing, based on the second location of the user device being outside the geofence around the first location of the automated teller machine, the paired state between the user device and the automated teller machine to be terminated.

18. The method of claim 7, further comprising:

causing, based on the second location of the user device being outside the geofence around the first location of the automated teller machine, the paired state between the user device and the automated teller machine to be terminated.

19. The one or more non-transitory computer-readable media of claim 13, wherein the operations further comprise:

terminating, based on the second location of the user device being outside the geofence around the first location of the automated teller machine, the paired state between the user device and the automated teller machine.

\* \* \* \* \*